May 17, 1966   J. C. SPRACKLIN ETAL   3,251,200
BIDIRECTIONAL SELF-RESETTING OVERLOAD SLIP CLUTCH
Filed May 6, 1964

John C. Spracklin
George M. Robinson,
INVENTORS.

BY Harry M. Saragovitz
Edward J. Kelly
Herbert Berl
James E. Staudt

United States Patent Office 3,251,200
Patented May 17, 1966

3,251,200
BIDIRECTIONAL SELF-RESETTING OVERLOAD SLIP CLUTCH
John C. Spracklin, Mount Holly, N.J., and George M. Robinson, Havertown, Pa., assignors, by mesne assignments, to the United States of America as represented by the Secretary of the Army
Filed May 6, 1964, Ser. No. 365,543
10 Claims. (Cl. 64—30)

The present invention relates to a device for limiting the amount of torque that may be transmitted to a driven member by a prime mover and to effectively disengage the driving connection between the prime mover and the driven member during periods of overload. Conventionally slip clutches are devices having contacting friction elements which will allow relative rotation between these elements when a predetermined torque is applied. The general operation of such devices is quite simple, however, in certain applications their durability is unsatisfactory because unless the overload torque is quickly eliminated the friction elements will continue to slip causing overheating and destruction of the device.

The present invention provides a device which has a relatively high coefficient of friction between the friction elements in its initial condition and substantially eliminates friction between these elements once an overload torque has been applied. To reduce friction between friction elements my invention contemplates the application of a lubricant therebetween. Thus, an overload torque may be applied for long periods of time without danger of damage to the friction elements. In order to reset the device it is necessary only to eliminate the driving torque instantaneously and the clutch again is ready for operation.

Accordingly, it is an object of this invention to provide an overload clutch which may be operated under a continuing overload without damage to the clutch mechanism.

Another object of our invention is to provide an overload clutch which may be reset by simply removing the overload torque from the driving member of the clutch.

Yet another object of our invention is to provide an overload clutch which is operable in either rotational direction.

Still another object of our invention is to provide an overload clutch which is relatively simple in design and inexpensive to manufacture.

A further object of our invention is to provide a clutch having characteristics which may be changed by varying the properties of the friction fluid which is used in the clutch.

Figure 1:
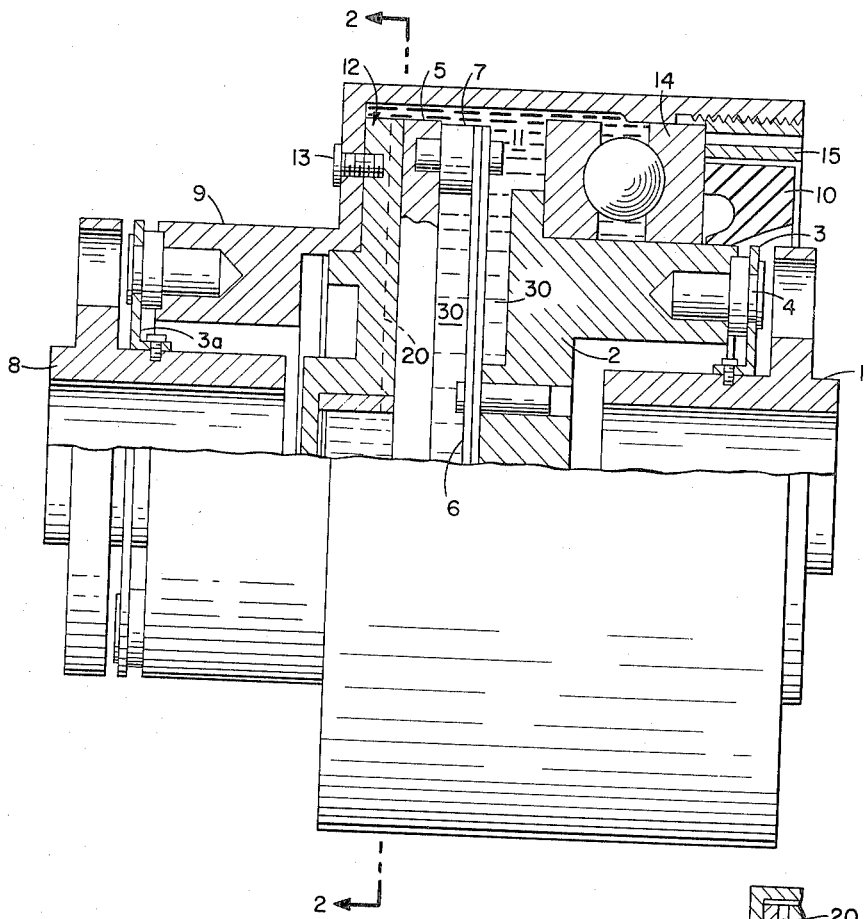
Figure 2:
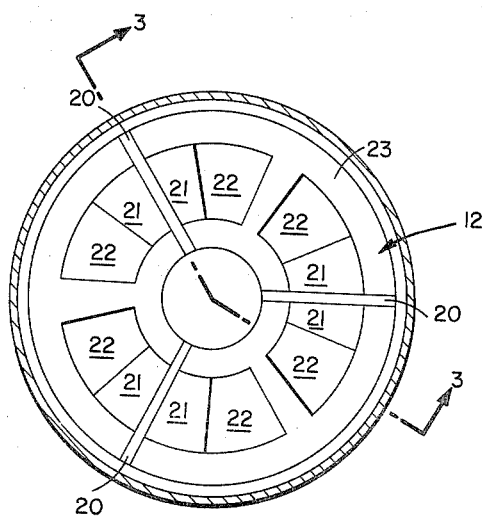

Other features of our invention will become apparent in accordance with the following description hereof with reference to the accompanying drawings given merely by way of example and which:

FIGURE 1 is a sectional view of our device showing the relative cooperation between the members thereof, and FIGURE 2 is a section taken on line 2—2 of FIGURE 1 showing the configuration of the surface of the clutch plate of our device.

Figure 3:
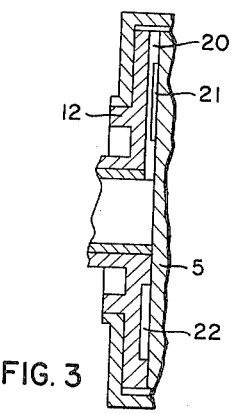

FIGURE 3 is a section taken on line 3—3 of FIGURE 2 showing the relative depth of the grooves 20, lands 21 and pockets 22.

Referring now to FIGURE 1, a driving hub 1 is connected to a driving sleeve 2 by means of a flexible disk 3 thereby forming a unitary driving unit. Disk 3 is maintained in position by rivets 4 or other suitable means. A clutch disk 5 is flexibly attached to driving sleeve 2 by means of a spring plate 6 which is attached by rivets or other suitable means and is maintained a proper distance from the disk by spacers 7. A driven hub 8 is attached to a driven sleeve housing 9 by a flexible disk 3a thus forming a driven unit assembly. The driven sleeve housing extends around clutch disk 5 and axially beyond driving sleeve 2, and with the aid of seal 10 and sleeve 2 forms a sealed chamber 11. A clutch plate 12 is rigidly attached to the driven sleeve housing by means of cap screws 13 or other suitable means. Contained within sleeve housing 9 is an intermediate bearing 14, one race of which is attached for rotation with driving sleeve 2, the other being rotatably attached to housing 9. An annular nut 15 is threaded to the inner surface of housing 9 and provides an adjustment between housing 9 and the driven members 1 and 2.

By varying the position of the driven housing relative to the driving members the tension applied between friction disk 5 and clutch plate 12 by spring plate 6 may be varied. It will be noted that spacers 7 located between spring plate 6 and clutch disk 5 provide the clearance necessary for movement of the driving sleeve toward the clutch disk when increasing the tension between clutch plate 12 and clutch disk 5.

Reference is now made to FIGURE 2, which is an illustration of the surface design of clutch plate 12. A series of grooves 20 are cut in the surface of the plate. These grooves extend radially from the inner portion of the annular plate to the outer portion thereof. Immediately adjacent either side of grooves 20 are located pumping lands 21 which are indentions generally approximately .001 inch below the surface of the plate. Immediately adjacent the pumping lands are located fluid pockets 22 which are machined similarly to lands 21 but which extend approximately .01 to .02 of an inch below the surface of the plate. The remainder of the clutch plate surface 23 comprises a uniform flat surface which engages the surface of clutch disk 5. The depth of lands 21 and pockets 22 will, of course, vary in accordance with the application of the device and the characteristics of the lubricating fluid which is used in the device.

In operation of the device, torque is applied to driving hub 1 and transmitted to clutch disk 5 via driving sleeve 2, spring plate 6 and their connecting elements. This torque is applied to clutch plate 12 and is transferred via driven sleeve 9 to driven hub 8. As pointed out above, the friction between clutch plate 12 and clutch disk 5 is dependent upon the adjustment of tension nut 15 which controls the tension exerted by plate spring 6. Chamber 11 is substantially filled with a fluid 30 which is prevented from escaping seal 10 mounted between housing 9 and driving sleeve 2. Assuming an excessive torque is applied to the driving hub, slipping will occur between clutch plate 12 and clutch disk 5. Chamber 11 being filled with fluid, it will be obvious that the fluid will fill grooves 20 during rotation of the device. Upon relative movement between clutch plate 12 and clutch disk 5 caused by excessive torque, fluid will be drawn into pumping lands 21 from whence it will continue into the deeper fluid pockets 22. This fluid will be forced into these areas at various pressures depending upon the relative speed between the clutch plate and the disk. As this relative speed increases, the pressure is increased and the friction elements will be forced an infinitesimal distance apart thus allowing fluid to completely cover the flat friction surface 23 of the clutch plate. The pumping action between the relatively rotating friction elements is caused primarily by the skin friction which exists between the friction surfaces and the fluid within the enclosure. The presence of fluid between the plate and disk will of course substantially eliminate the driving torque between the friction elements. This condition will continue until the relative speed between the plate and disk is reduced or eliminated thus, eliminating the flow of fluid between the friction surfaces of the plate and disk. Thus, to reset the clutch it is necessary only to stop or drastically reduce the speed of the driving hub to a point at which relative movement between the plate and disk will be insufficient to maintain a fluid pumping action, thus, permitting reengagement of the friction surfaces. It will be apparent that with the reduction of fluid pressure between the friction surfaces spring plate 6 will tend to squeeze the fluid from between the surfaces of the plate and the disk.

From the foregoing it will be seen that the device provides a clutch which will have great durability even when subjected to torque overloads of long duration. In effect the clutch friction surfaces serve a dual purpose in that during driving they act as a clutch disk and plate while when overloaded they act as bearing surfaces. The clutch offers an infinite variety of adjustments since its operation is dependent upon the characteristics of the fluid with the chamber 11 as well as the tension and adjustment of spring 6.

The foregoing is a description of the preferred embodiment. The following claims are intended to include those modifications and variations that are within the spirit and scope of the invention.

We claim:

1. A bidirectional self-resetting overload slip clutch comprising a driving unit, axially flexible means connected to said driving unit and to a friction disk to flexibly support said friction disk and provide a driving connection between said driving unit and said friction disk, a friction plate positioned in face-to-face relationship with said friction disk, means connecting said plate to a driven sleeve housing, said housing surrounding said plate and disk means and being attached to a driven hub, antifriction means positioned between said housing and said driving unit, sealing means between said housing and said driving unit forming a closed chamber surrounding said friction elements, fluid retaining means formed in the surface of said friction plate and being closed by said friction disk except for fluid communication means in said plate that connects said fluid retaining means to said closed chamber.

2. A device as set forth in claim 1 wherein said fluid communicating means comprises at least one groove formed in the surface of said friction plate and wherein said fluid retaining means comprises at least one shallow depressed area in the surface of said plate.

3. A bidirectional self resetting overload slip clutch comprising a driving unit, axially flexible means connecting said driving unit to a friction disk, a friction plate positioned in face-to-face relationship with said friction disk, means connecting said plate to a driven sleeve housing, said housing surrounding said plate and disk means and being attached to a driven hub, antifriction means positioned between said housing and said driving unit, sealing means between said housing and said driving unit forming a closed chamber surrounding said friction elements, at least one fluid communication groove formed in the surface of said friction plate, and fluid retaining means formed in the surface of said friction plate and including at least two shallow depressed areas formed in the surface of said plate, on either side of said groove, and in fluid communication with said groove.

4. A device as set forth in claim 3 wherein a series of similarly arranged grooves and depressed areas are formed radially about the surface of said friction plate.

5. A bidirectional self resetting overload slip clutch comprising: a driving unit, a driven unit, a pair of friction elements connected to said driving and driven units and frictionally engaging each other, a sealed chamber surrounding said elements, the friction surface of one of said elements having at least one recessed area thereon defining a pumping land and a fluid pocket, and means providing fluid communication between said recessed area and said sealed chamber to provide fluid communication to said pumping land and fluid pocket.

6. A device as set forth in claim 5 wherein said fluid communication means is a groove cut in the friction surface of one of said friction elements.

7. A device as set forth in claim 6 wherein the friction surface of one of said friction elements is provided with a series of equally spaced radially extending grooves.

8. A device as set forth in claim 7 wherein a pumping land is located adjacent each side and in fluid communication with each of said radially extending grooves and wherein a fluid pocket is provided in fluid communication with each of said pumping lands.

9. A device as set forth in claim 8 wherein said fluid pockets are located adjacent said pumping lands and extend deeper into the friction surface than do said pumping lands.

10. A device as set forth in claim 9 wherein said closed chamber is substantially filled with fluid.

References Cited by the Examiner

UNITED STATES PATENTS

| | | | |
|---|---|---|---|
| 2,952,146 | 9/1960 | Bruck | 64—30 |
| 2,953,911 | 9/1960 | Tigerman | 64—30 |
| 3,025,686 | 3/1962 | Lewis | 64—30 |

FOREIGN PATENTS 697,252  10/1940  Germany.

MILTON KAUFMAN, *Primary Examiner.*

BROUGHTON G. DURHAM, *Examiner.*

H. C. COE, *Assistant Examiner.*